(12) United States Patent
Seith

(10) Patent No.: US 7,143,467 B2
(45) Date of Patent: Dec. 5, 2006

(54) VACUUM CLEANER WITH LIGHT GUIDING ELEMENT

(75) Inventor: Thomas Seith, Bad Neustadt (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 82 days.

(21) Appl. No.: 10/928,197

(22) Filed: Aug. 27, 2004

(65) Prior Publication Data

US 2005/0273968 A1 Dec. 15, 2005

Related U.S. Application Data

(63) Continuation of application No. PCT/EP03/01330, filed on Feb. 11, 2003.

(30) Foreign Application Priority Data

Feb. 27, 2002 (DE) ............................... 102 08 366

(51) Int. Cl.
*A47L 5/00* (2006.01)
*A47L 9/00* (2006.01)
*G02B 6/00* (2006.01)

(52) U.S. Cl. ........................................ 15/339; 385/147

(58) Field of Classification Search ................. 15/319, 15/327.1, 327.2, 327.3, 327.4, 327.6, 327.7, 15/339, 350–353; 385/14, 147
See application file for complete search history.

(56) References Cited

U.S. PATENT DOCUMENTS

| 2,107,016 | A | | 3/1938 | Snyder | |
|---|---|---|---|---|---|
| 4,245,370 | A | | 1/1981 | Baker | |
| 4,654,924 | A | * | 4/1987 | Getz et al. ..................... | 15/319 |
| 4,692,754 | A | | 9/1987 | Edejer et al. | |
| 4,733,430 | A | | 3/1988 | Westergren | |
| 4,955,103 | A | | 9/1990 | Scott et al. | |
| 5,075,922 | A | * | 12/1991 | Tsuchida et al. ............... | 15/339 |
| 5,301,385 | A | * | 4/1994 | Abe et al. ...................... | 15/319 |
| 5,343,590 | A | * | 9/1994 | Radabaugh ................... | 15/319 |
| 5,467,501 | A | | 11/1995 | Sepke | |
| 5,542,146 | A | * | 8/1996 | Hoekstra et al. ............... | 15/319 |
| 5,555,329 | A | * | 9/1996 | Kuper et al. ................... | 385/36 |
| 5,945,636 | A | * | 8/1999 | Sakich et al. ................ | 174/174 |

FOREIGN PATENT DOCUMENTS

| DE | 35 39 113 A1 | 5/1987 |
|---|---|---|
| EP | 0 401 531 A2 | 12/1990 |

* cited by examiner

*Primary Examiner*—Terrence R. Till
(74) *Attorney, Agent, or Firm*—Craig J. Loest; Russell W. Warnock

(57) ABSTRACT

A vacuum cleaner has one or more display indicators on its housing. The indicators are supplied with light from at least one light source assigned thereto in order to optically indicate an operation condition. An electrical component actuates the at least one light source according to the operation condition. In order to create a vacuum cleaner in which the light source can be disposed elsewhere than directly below the display indicators, yet the indicators are nevertheless well illuminated, a light guiding element is disposed between the light source and the display indicators, which redirects the light that is emitted by at least one light source to the display. The assembly provides for the advantage that the distance and the structural differences between the light sources and the display indicators can be easily bridged, so that these functional components do not need to be directly adapted to one another.

18 Claims, 4 Drawing Sheets

VACUUM CLEANER WITH LIGHT GUIDING ELEMENT

CROSS-REFERENCE TO RELATED APPLICATION

This is a continuing application, under 35 U.S.C. § 120, of copending international application No. PCT/EP03/01330, filed Feb. 11, 2003, which designated the United States; this application also claims the priority, under 35 U.S.C. § 119, of German patent application No. 102 08 366.5, filed Feb. 27, 2002; the prior applications are herewith incorporated by reference in their entirety.

BACKGROUND OF THE INVENTION

FIELD OF THE INVENTION

The invention relates to a vacuum cleaner with at least one indicating means. The indicating means is disposed at a housing and is fed with light by at least one assigned electrical light source, for optically indicating an operating state, with an electrical module, which activates the at least one light source in dependence on the operating state.

There exist prior art vacuum cleaners with optical indicating means that inform the user as to whether for example the vacuum cleaner is in operation, the dust bag is full or what power output is being produced by the vacuum cleaner. The optical indicating means may be formed of transparent or partly transparent windows in a wall of the housing of the vacuum cleaner. Arranged on an electrical module behind these windows are light sources, which irradiate the window directly.

A disadvantage of these prior art vacuum cleaners is that the light sources have to be disposed directly underneath the windows to make possible an indicating device that is well illuminated. It must consequently be ensured that the light sources are fitted in the interior of the vacuum cleaner housing right where the housing carries the indicating means.

SUMMARY OF THE INVENTION

It is accordingly an object of the invention to provide a vacuum cleaner, which overcomes the above-mentioned disadvantages of the heretofore-known devices and methods of this general type and in which vacuum cleaner the light sources can be arranged at locations other than directly underneath the indicating means and in which the indicating means can nevertheless be illuminated well.

With the foregoing and other objects in view there is provided, in accordance with the invention, a vacuum cleaner, comprising:

a housing;
at least one indicator on said housing;
an electrical light source for supplying light to said at least one indicator, for optically indicating an operating state of the vacuum cleaner;
an electrical module connected to and activating said light source in dependence on the operating state;
a light guiding component disposed between said light source and said indicator for guiding light emitted by said light source to said indicator; and
said indicator being formed with an expanding arrow indicating a power output of the vacuum cleaner, to be illuminated in dependence on the power output of the vacuum cleaner.

In other words, the object of the invention are achieved with the vacuum cleaner that has a light guiding component for guiding light emitted by the at least one light source to the at least one display indicator arranged between the light source and the indicator. This allows the light source and the indicating means to be at a distinct distance from each other, without the luminosity of the display being impaired. This has the advantage that the positions of the indicating means on the housing of the vacuum cleaner can be chosen very differently for different models and the position of the light sources in the interior of the vacuum cleaner can remain the same for all models. An identical internal construction can be used for different models of vacuum cleaners. The consequent positional differences of light sources and indicating means can be overcome by differently designed light guiding components.

The light sources are often formed as light-emitting diodes, which are soldered directly on an electrical module, such as for example a printed circuit board. A number of diodes present are in this way rigidly fixed in their mutual positions. The printed circuit board is generally fastened in the interior of the vacuum cleaner to a flange of the housing or to further vacuum cleaner components fastened in the housing. As a result, the position of the group of diodes in the housing of the vacuum cleaner is also rigidly fixed.

The light guiding component according to the invention allows different housing covers with differently arranged indicating means to be used in identical basic units for different vacuum cleaner models. This dispenses with the need to adapt the basic unit to the different types of model. All that is required for the different vacuum cleaner models is to use different light guiding components. Adaptation of the light guiding components alone is possible at low cost and is not very complex. Adaptation of the installation position of the light sources or of the printed circuit board which carries the light sources is much more complex. The invention therefore produces a low-cost range of models of vacuum cleaners. When newly designing a vacuum cleaner, in the same way already known components can be retained and only the light guiding components and the housing cover have to be newly designed in their construction.

In accordance with a specific feature of the invention, the light guiding component is formed with an entry face facing the light source, an exit face facing the indicating means and at least one reflection face, for reflecting at least part of the light introduced into the light guiding component via the entry face in the direction of the exit face. The number and position of the reflection faces allow the light from virtually any desired entry point to be passed to the indicating means largely without any loss. The number and position of the reflection faces are dependent on the actual positional difference between the light source and the associated indicating means.

In accordance with an advantageous feature of the invention, the light guiding component comprises a multiplicity of light guiding portions which guide the light emitted by various light sources into separate indicating means. This has the advantage that a number of light guides which can be activated independently of one another can be assigned to a number of different indicating means and only a single light guiding component is required. The number of light guiding portions grouped together in the light guiding component are optically decoupled from one another by suitable separating webs, so that they do not influence one another.

In a preferred variant of the invention, each light guiding portion is respectively optically connected to a light source and to an assigned indicating means. Depending on the function of the indicating means, whether for example the vacuum cleaner is in operation, the dust bag is full or what power output is being produced by the vacuum cleaner, these may differ in size, shape or color. In one particular configuration, the indicating means which indicates the power output of the vacuum cleaner is formed as an expanding arrow. The expanding arrow comprises a series of indicating fields which have increasing sizes. In the case of a very low power output, only a few light sources are operated, as a result of which only a few segments of the expanding arrow light up. In the case of high power output, many light sources are operated and many segments of the expanding arrow are illuminated. In the case of full power output, all the light sources light up, as a result of which all the segments of the expanding arrow are illuminated.

In a preferred configuration, the light guiding component has latching means for fastening the light guiding component on the electrical module. Such a light guiding component may for example be clipped onto the edge of a printed circuit board which is carrying light-emitting diodes. This has the advantage that the printed circuit board and the light guiding component may be preassembled as a joint subassembly.

Alternatively, the light guiding component may have latching means which can be clipped on an inner side of the housing. This has the advantage that the light guiding component, which differs according to the vacuum cleaner model, can be fastened on the housing cover, which differs according to the model. This makes it possible for associated housing covers and light guiding components to be assigned to one another in a simple manner. Housing covers together with the indicating means and the light guiding component can then be inserted as a preassembled component into a basic unit.

For low-cost production of the light guiding components according to the invention, they may be produced by the plastics injection-molding process.

Other features which are considered as characteristic for the invention are set forth in the appended claims.

Although the invention is illustrated and described herein as embodied in a vacuum cleaner with light guiding element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
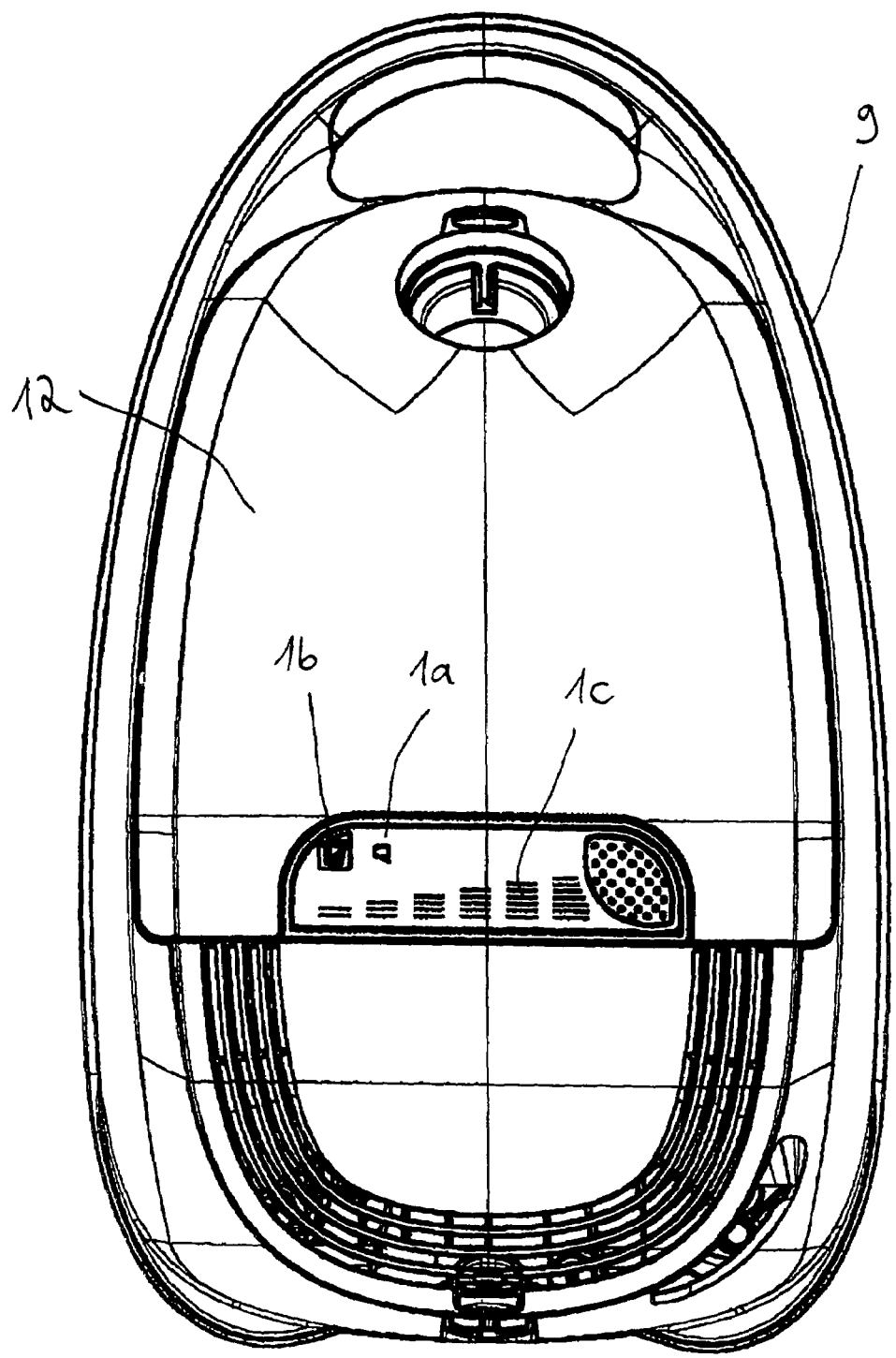
FIG. 1 is a plan view of a vacuum cleaner according to the invention.

Referring now to the figures of the drawing in detail and first, particularly, to FIG. 1 thereof, there is shown a vacuum cleaner according to the invention. A first indicator or indicating means 1a is an operation indicator. A second indicator or indicating means 1b is formed as a filter bag indicator. A third indicator or indicating means 1c comprises a multiplicity of differently dimensioned indicating units, which form an expanding arrow by means of which the power output is indicated. The first indicating means 1a, the second indicating means 1b, and the third indicating means 1c are accommodated in a cover 12 of a housing of casing 9.

Figure 2:
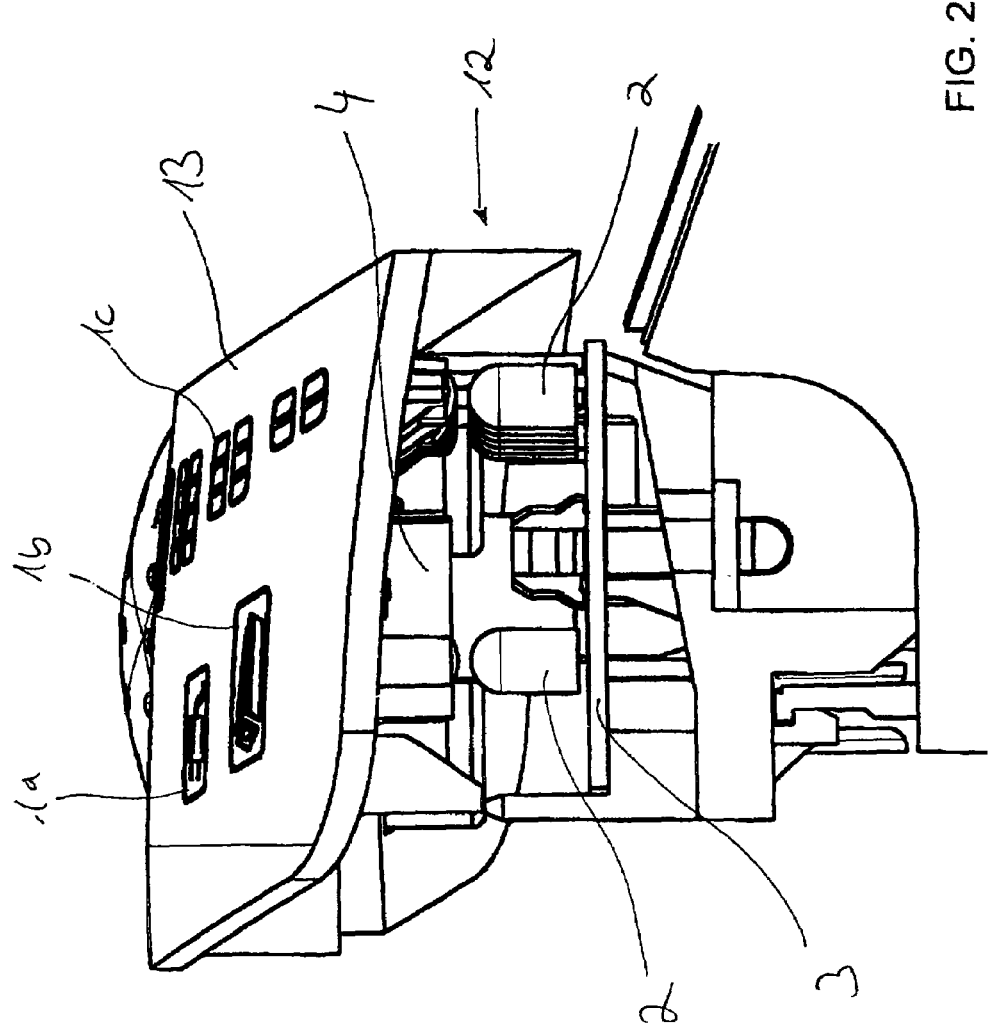
FIG. 2 is a partial elevational view of a subassembly including an electrical module, light sources, light guiding component, and indicating means.

FIG. 2 shows a portion 13 of the cover 12 which has the first indicating means 1a, the second indicating means 1b, and the third indicating means 1c on its surface. At a distance from the surface of the portion 13, the light sources 2 are fastened on an electrical module 3. The light sources 2 are formed as light-emitting diodes (LEDs). The electrical module 3 is formed as a printed circuit board. Arranged between the light sources 2 and the indicating means 1a, 1b, 1c is a light guiding component 4, or optical conductor.

Figure 3:
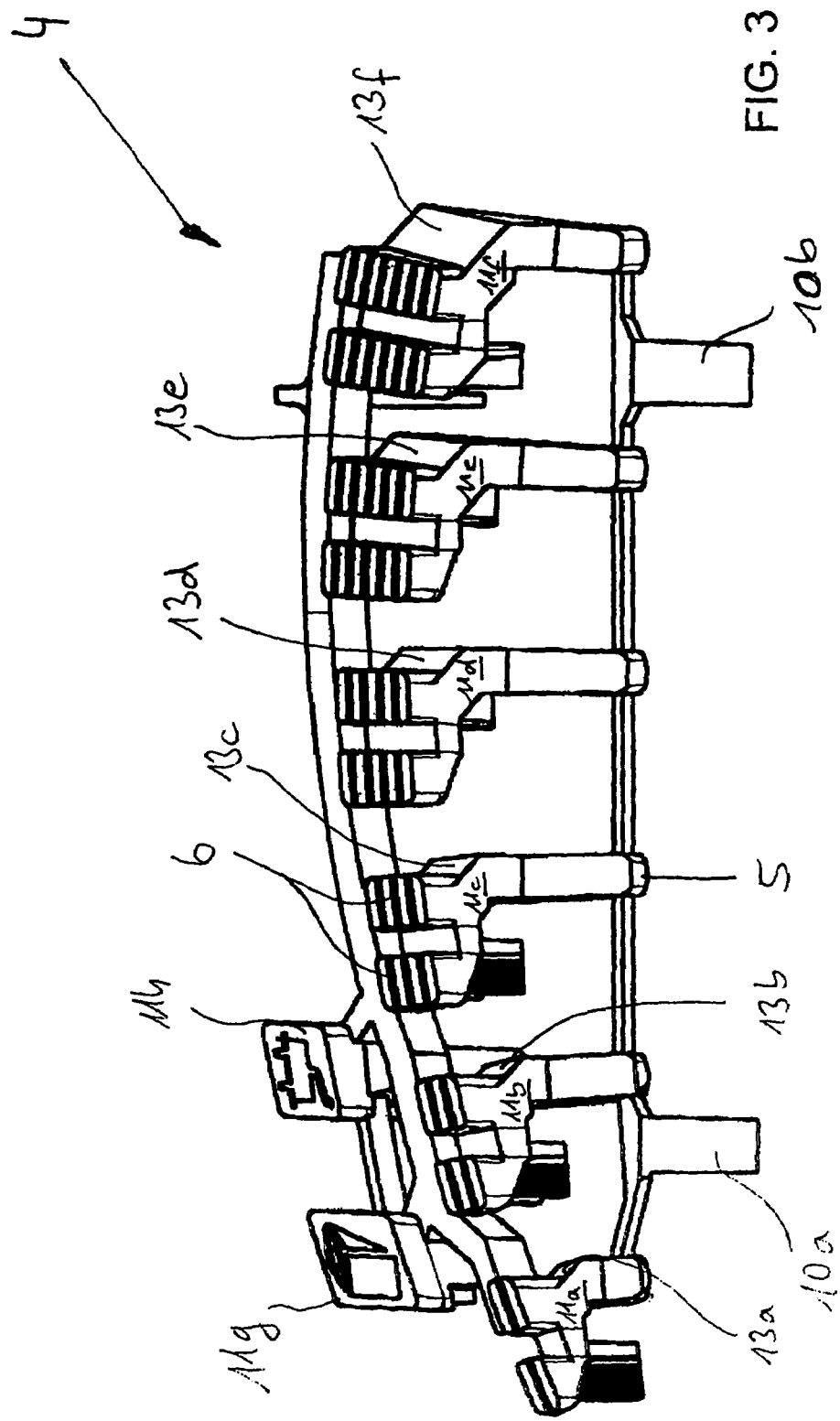
FIG. 3 is a side view of the light guiding component of FIG. 2.

FIG. 3 shows the light guiding component 4 from FIG. 2. The light guiding component 4 is formed as a one-piece plastics injection molding. Altogether, there are six optically separate light guiding portions 11a, 11b, 11c, 11d, 11e, 11f on the exemplary light guiding component 4. Each of the light guiding portions 11 has an entry face 5, via which the light emitted by the light source 2 (FIG. 1) is coupled in. On each light guiding portion there is at least one exit face 6. In the exemplary embodiment shown, each light guiding portion 11 has an entry face 5 which is optically connected to two exit faces 6. The six optically separate light guiding portions 11a, 11b, 11c, 11d, 11e, 11f together form the expanding arrow of the power output indicator. The light guiding component 4 also comprises a separate light guiding portion 11g for the filter bag indicator and light guiding portion 11h for the operation indicator. Formed on the light guiding component 4 are two latching members 10a and 10b, which fasten the light guiding component 4 on the electrical module 3 (FIG. 2).

Figure 4:
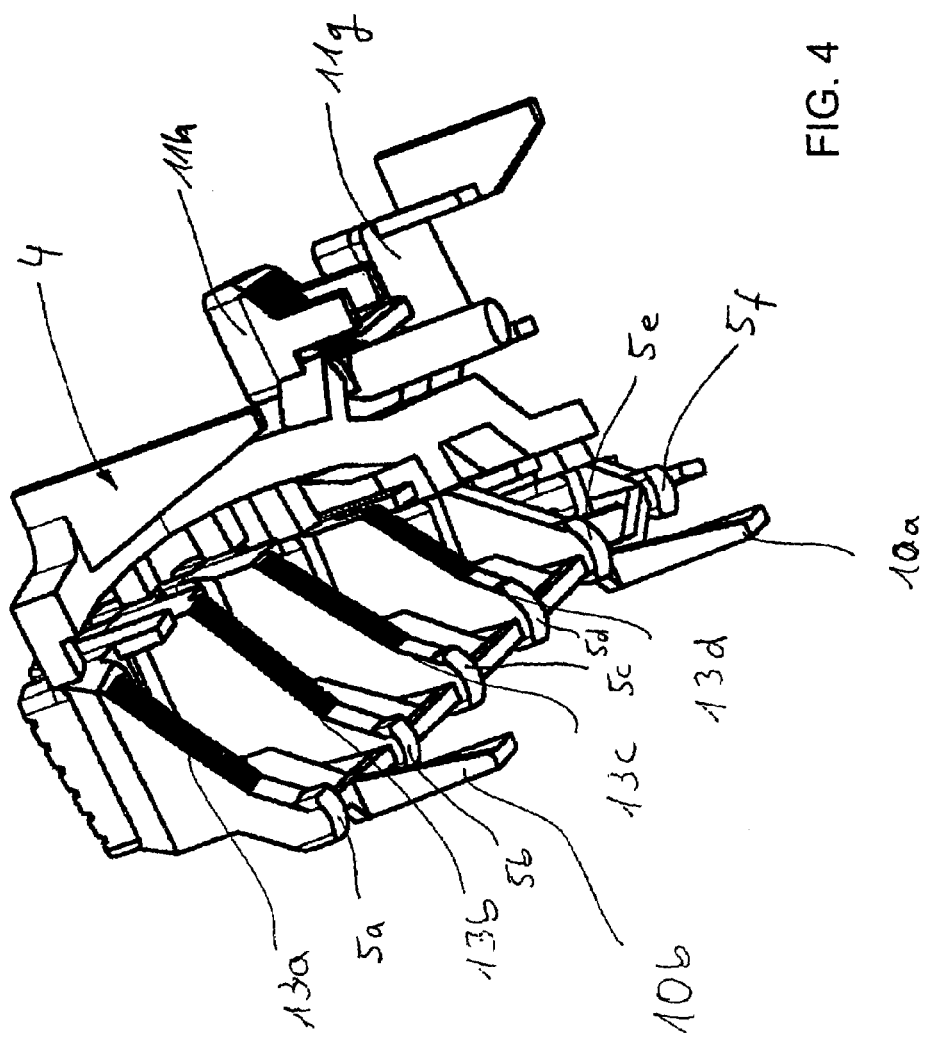
FIG. 4 is a bottom-perspective view of the exemplary light guiding component illustrated in FIGS. 2 and 3.

A multiplicity of reflection faces 13a, 13b, 13c, 13d, 13e, 13f, which reflect the light entering the light guiding component 4 via the entry face 5 in a suitable way to the exit face are shown both in FIG. 3 and FIG. 4.

I claim:

1. A vacuum cleaner, comprising:
   a housing;
   at least one indicator on said housing;
   an electrical light source for supplying light to said at least one indicator, for optically indicating an operating state of the vacuum cleaner;
   an electrical module connected to and activating said light source in dependence on the operating state;
   a light guiding component disposed between said light source and said indicator for guiding light emitted by said light source to said indicator, said light guiding component including a light guiding portion formed with an entry face disposed to face said light source and is optically connected to two exit faces; and
   said indicator being formed with an expanding arrow indicating a power output of the vacuum cleaner, to be illuminated in dependence on the power output of the vacuum cleaner.

2. The vacuum cleaner according to claim 1, wherein said indicator includes a plurality of indicating units differing in size, shape, or color.

3. The vacuum cleaner according to claim 1, wherein said expanding arrow has a multiplicity of differently dimensioned indicating units, disposed in series of indicating fields of increasing size and defining a power output indicator.

4. The vacuum cleaner according to claim 1, wherein said at least one light source is one of a multiplicity of light sources, and said light guiding component comprises a multiplicity of light guiding portions each for guiding light emitted by the respective said light sources into separate indicating fields of said indicator.

5. The vacuum cleaner according to claim 4, wherein a separate light guiding portion is provided for a filter bag indicator.

6. The vacuum cleaner according to claim 4, wherein a separate light guiding portion is provided for an operation indicator.

7. The vacuum cleaner according to claim 4, wherein each of said light sources is optically connected to a respectively assigned indicator by each light guiding portion.

8. The vacuum cleaner according to claim 7, wherein each light guiding portion is formed with an entry face disposed to face said light source and is optically connected to two exit faces of said indicator facing indicating fields thereof.

9. The vacuum cleaner according to claim 8, wherein said light guiding component is formed with at least one reflection face, for reflecting at least a part of the light introduced into said light guiding component via said entry faces in the direction towards exit faces thereof.

10. The vacuum cleaner according to claim 1, wherein said light guiding component is formed with latching devices configured to fasten said light guiding component on said electrical module.

11. A vacuum cleaner, comprising:
   a housing having an indicator indicating an operating state of the vacuum cleaner;
   a light source supplying light to said at least one indicator; and
   a light guiding component disposed between said light source and said indicator and forming a conduit guiding light emitted by said light source to said indicator, said light guiding component including a light guiding portion forming a conduit having an entry aperture facing said light source and two exit apertures.

12. The vacuum cleaner according to claim 11, wherein the indicator is formed as an expanding arrow shape indicating a power output of the vacuum cleaner and is illuminated in dependence on the power output of the vacuum cleaner.

13. The vacuum cleaner according to claim 11, wherein the light source includes multiple light sources.

14. The vacuum cleaner according to claim 11, wherein the light source includes LEDs.

15. The vacuum cleaner according to claim 11, wherein the light guiding component comprises multiple of light guiding portions guiding light emitted by the light source into separate indicating fields of the indicator, each light guiding portion forming a separate conduit having an entry aperture facing said light source and two exit apertures.

16. The vacuum cleaner according to claim 15, wherein the light source includes multiple light sources and each light source is optically connected to a corresponding light guiding portion.

17. The vacuum cleaner according to claim 11, wherein the light guiding component includes a reflection face reflecting light received into the light guiding portion through entry aperture toward exit apertures.

18. The vacuum cleaner according to claim 11, further comprising an electrical module connected to and activating said light source in dependence on the operating state of the vacuum cleaner, the light guiding component being formed with latching devices configured to connect the light guiding component to the electrical module.

* * * * *